(12) United States Patent
Taylor

(10) Patent No.: US 6,302,004 B1
(45) Date of Patent: Oct. 16, 2001

(54) METHOD AND APPARATUS FOR INCREASING THE PRODUCTIVITY OF CNC MACHINE TOOLS

(76) Inventor: Aaron Gawain Taylor, 968 Ridgebrook Rd., Lexington, KY (US) 40509

( * ) Notice: Subject to any disclaimer, the term of this patent is extended or adjusted under 35 U.S.C. 154(b) by 0 days.

(21) Appl. No.: 09/522,187

(22) Filed: Mar. 9, 2000

Related U.S. Application Data

(60) Provisional application No. 60/123,953, filed on Mar. 12, 1999.

(51) Int. Cl.$^7$ ............................... B23B 1/00; B23B 27/10
(52) U.S. Cl. ........................ 82/1.11; 82/5; 82/6; 82/11
(58) Field of Search ........................ 82/1.11, 50, 52, 82/901, 120; 407/5, 6, 11

(56) References Cited

U.S. PATENT DOCUMENTS

| | | | |
|---|---|---|---|
| 5,098,233 | | 3/1992 | Patterson et al. .................... 407/101 |
| 5,340,242 | * | 8/1994 | Armbrust et al. .................... 407/11 |
| 5,358,360 | * | 10/1994 | Mai ................................. 407/11 X |
| 5,388,487 | * | 2/1995 | Danielsen .......................... 407/11 X |
| 5,664,470 | * | 9/1997 | Garnett et al. ....................... 82/121 |
| 5,829,331 | * | 11/1998 | Mai ................................... 407/11 |
| 5,873,684 | * | 2/1999 | Flolo ................................. 407/11 |

FOREIGN PATENT DOCUMENTS

| | | | |
|---|---|---|---|
| 1049661 A | * | 1/1959 | (DE) ................................. 407/11 |
| 0022097 | * | 1/1981 | (EP) ................................. 407/11 |
| 0319662 | * | 6/1989 | (EP) ................................. 407/11 |

OTHER PUBLICATIONS

Max Cool™ http://www.slabemachine.com, Feb. 18, 2000.
Journal of Materials Processing Technology 62, 1996 "Chip Breaking Analysis from the View point of the Optimum Cutting Tool Geometry Design" J. Shinozuka, T. Obikawa, T. Shirakashi pp. 345–351.

\* cited by examiner

*Primary Examiner*—Henry Tsai
(74) *Attorney, Agent, or Firm*—Jack Toliver

(57) ABSTRACT

A CNC machine tool has a turret (10), a reservoir of coolant, a pump supplying coolant under pressure from the reservoir (not shown) to the turret (10), a tool holder (13) mounted on the turret at a tool station (8) opposite a rotatable spindle (not shown) upon which a workpiece is mounted for a cutting operation. A coolant bored tool bar (18) is clamped in the tool holder. It has an insert (9) with a rake face (38) for gouging out metal chips. The insert rake face and chips have an an edge boundary temperature gradient decreasing away from the rake face. A sleeve (24) removeably attaches to the coolant bored tool bar and an O-ring (25) seals around the end of the bar defining a chamber (30) supplied with coolant under pressure. The only outlet from this chamber is the bore (32) of the tool bar. It has a blind end (35) from which a passageway restriction (34) extends toward the surface of the bar for directing a jet of high pressure coolant on the insert behind the boundary layer of plastic deformation of chip formation. The temperature gradient away from the friction face of the tool is reduced to prolong tool life and promote consistent chip breaking.

17 Claims, 1 Drawing Sheet

METHOD AND APPARATUS FOR INCREASING THE PRODUCTIVITY OF CNC MACHINE TOOLS

PRIOR APPLICATION

Figure 1:
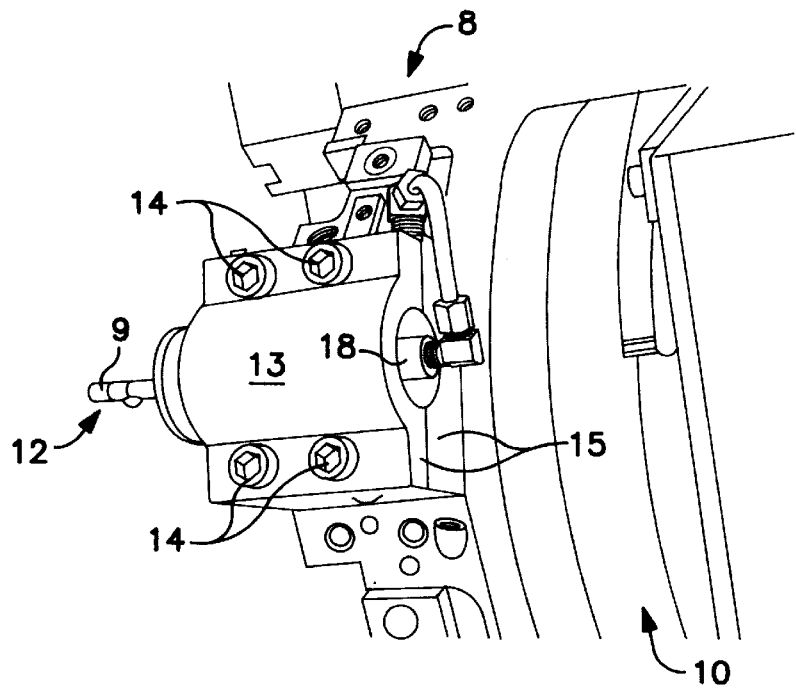

This application is based on a provisional application Ser. No. 60/123,953 filing date Mar. 12, 1999 entitled Adapter With Coolant Connection For Machine Tool by Aaron Gawain Taylor, the inventor of the present application.

FIELD OF THE INVENTION

Computer numerically controlled (CNC) operations are pre-programmed machining steps for broaching, boring, drilling, milling, or other metal cutting operations performed sequentially on a rotating workpiece spindled opposite a turret within a cabinet. A fluid coolant under pressure delivered at volumes of up to eight gallons per minute bathes the cutting tool which is indexed into position by the turret, and either it, or the spindle, is advanced to perform a given metal cutting operation before the turret is indexed to perform the next cutting operation.

BACKGROUND OF THE INVENTION

CNC machining requires the control of a number of variables in order to attain maximum productivity for a given cutting operation. The severity of the cutting operation being performed will change the rate of feed or depth of cut. For example, broaching is a more rigorous cutting operation than sawing.

Metals have various machining ratings. The hardness influences a workpiece's machinability. Steel manufactured bars will be either hot rolled or cold drawn, which affects the hardness. A hardness in excess of 400 Brinell is not uncommon. For example, cold drawn plain carbon steels, containing less than three tenths of one per cent (0.3%) carbon, have better machinability than a hot rolled steel in a carbon range of between 0.3% to 0.4%. But there is little difference in the machinability between cold rolled or hot rolled steels until the carbon content becomes more than 0.4%, and then the hot rolled steel has a machinability superior to that of a cold rolled or cold drawn steel having 0.4% carbon or more. The alloy composition, and physical properties due to heat treating, tempering or annealing changes the hardness and thus machinability. Alloy steels such as stainless steel have lower machinability ratings and will require slower cutting speeds, shallower depths of cut, higher cooling rates, and more efficient coolants than plain carbon steel to avoid the buildup of stress in the part and overheating the cutting tool.

Uniform chips that can be carried away by a flood of coolant to maintain the work area relatively clean of chip debris is important. More important still is the shape and color of the chips. Chips that exhibit breaking in discontinuous curls of a "6" or "9" shape when removed are indicative of good temperature control. Blue or blackened chips are a sign of excessive temperature and stress buildup in the tool and workpiece, shortening tool life and introducing surface irregularities to the workpiece.

Temperature buildup in the tool can quickly destroy the cutting edge geometry of an expensive tool insert where cooling is critically important for tool life. The speed of cutting will usually provide a fairly good surface quality to the workpiece minimizing the need for lubrication. As a general guideline, an insert will have a twenty minute cutting life under normal conditions before it must be flipped over to provide a new cutting face or edge geometry, before being replaced entirely with a new insert depending upon the finish tolerances allowed for the cutting operation. An insert will be selected according to the metal's machinability, type of finish required, feed rate, cutting depth and rake angle. An Insert is fastened in a tool bar which has a socket formed in one end for holding the insert rigidly at the desired rake angle, relative to the rotating workpiece. The tool bar is advanced by the turret head at a prescribed feed rate, and depth of cut, which are dimensionally pre-programmed factors in the setup of the machine tool. The more rigorous the set up conditions, the more coolant volume and pressure that are required to prevent excessive tool wear.

Since cooling tends to be a controllable factor essentially independent of the other setup conditions, reducing tool wear is directly proportional to the volume and pressure of the coolant. CNC machines have a coolant pump and reservoir of given capacity. A coolant system capacity of about eight gallons per minute is common. A delivery pressure of thirty (30) psi is typical, however auxiliary systems are available which increase the delivery pressure. But even with the higher pressures and cooling capacities of auxiliary systems, tool life remains the chief limiting factor in the productivity and cost reduction of most machining operations.

As a result, many CNC machine operators, in order to remain competitive, have attempted to get more efficiency out of their existing machine tool's cooling system by directing more of the coolant onto the tool insert by coolant bored holders and bars.

Coolant pumped to the turret is distributed to each tool station where a coolant bored tool holder may be used that has internal coolant passages that can direct more coolant toward the work than the conventional tool holder.

Also, center bored tool bars may add coolant more precisely to the insert. A port at the tool end near the insert may augment coolant delivery to tile tip, but longitudinal gaps still exist between the cylindrical bore of the tool holder and outer surfaces or diameter of the tool bar which may have a non-circular cross section creating a discontinuity, or one or more longitudinal gaps, between the tool bar and a clamping collar in the bore of the tool holder for securing the tool bar preventing any pressure being applied other than the existing output pump pressure.

Unfortunately, the amount of coolant that floods through the gaps, or bar bore to actually reach the cutting tool is problematical considering that the pressure is limited by the openness of the coolant delivery system. Coolant bored tool bar charts specify the the feed rate and rake angle assuming conventional coolant capacities. The delivery pressure from the center bore of the tool bar may be slightly raised by closing off the longitudinal gaps. By this technique, more coolant is forced down the center of the tool bar and projected by the port at the end directly onto the cutting edge, but still not much efficiency is gained because of the flow around and through the gaps on either side of the bar preventing the pressure from being increased beyond the existing pump pressure.

A tool bar with a coolant bore of this type is illustrated in U.S. Pat. No. 5,098,233 issued Mar. 24, 1992 to Circle Machine Company of Monrovia, Calif. U.S.A.

A coolant bored bar that is too long to be closed off inside of the tool holder must be cut off. This is a task any machine operator will try to avoid. Sawing to the proper length is necessary either to limit the tool tip projection length required since the front unsupported length should not be more than three times the diameter of the tool bar for the required tip rigidity, or the coolant bored bar will not fit behind the holder on the turret. Bars bore for cooling are expensive and cutting off the end limits the range of choices for using that bar in other setups. Choosing the right bar for the job requires balancing the set up requirements with the feed rate, depth of cut, edge geometry and other factors.

Resorting to more costly alternatives involves positioning coolant hoses at the tool tip, but piping routed around the tool holder gets in the way of the turret. Attempts to put temporary piping in place have uniformly failed. Vibration and the resultant pressures cause fittings to fail within a short time.

Consequently, accessory manufacturers have sprung up offering a separate cooling delivery systems. One such manufacturer is Slabe Machine, which markets the Max Cool™ attachment. This attachment includes a self contained housing separate from the tool holder. Coolant is delivered from the turret to a nozzle aimed at the tool insert at very high pressure. The nozzle focuses coolant directly on the tool tip at the exact trajectory that is optimal for both chip breaking and cooling efficiency. The coolant pressure is dramatically increased. The attachment increases it up to 5,000 psi due to the nozzle restriction. At the tool tip, where the boundary temperature gradient is greatest, the cooling efficiency is thus substantially increased. This product is an expensive solution to a long standing problem. But it is evidence of the machine industries need for higher productivity to remain competitive that such expensive alternatives are finding a market. Still the greater expense of these separate cooling systems is offset by the gains in productivity, tool life and quality. These attachments in conjunction with auxiliary pressure coolant systems increase productivity to levels unattainable with the prevailing pump pressures. Slabe Machine's web site may be found on the Internet at www..slabemachine.com./Slabe Machine Products, 4659 Hamann Parkway, Willoughby, Ohio, 44094, where a technical description is found for this attachment, for those who may be interested in a more detailed description.

SUMMARY OF THE INVENTION

In accordance with the present invention, a cooling system is provided in which a coupling apparatus removably attaches at the rear of a coolant bored tool bar. The bar is secured in the cutting position by a tool holder. The tool bar holder may have an internal conduit supplied with coolant from the turret the sole outlet from which is connected to a the coupling apparatus which defines a sealed chamber with the distal end of the tool bar having a center bore. The opposite end of the bore terminates in a blind end near the insert. A small passageway extends to the surface of the bar behind the insert such that a high pressure jet of coolant is directed on the insert edge where the temperature gradient is highest. Preferably the coupling apparatus has piping for coolant delivery from a coolant bored tool holder, but it may be independently connected to the prevailing pump pressure by any conduit system. The apparatus has a sleeve removably engaging the distal end of the bar. It is small enough to fit within the bore of the tool holder allowing the bar to be clamped within the tool holder, or for longer bars, the distal end can be placed rearwardly of the tool holder. Thus the sleeve is compact enough to not interfere with the setup conditions, including the requirement for higher quality that the work be as close as possible to the clamping sleeve of the bar within the tool bar holder.

The invention contemplates a cooling apparatus integral with machine tool having a coolant pump, a reservoir of coolant, a tool station, coolant connections from the pump to the tool station, a tool holder mounted in at the tool station, a coolant bored tool bar having a distal end through which the bore opens, and an opposite blind bore end, a tool insert mountable on the bar's opposite end, and a coupling apparatus capable of removably attaching to the distal end delivering the coolant under pressure to the open end, the blind end of the bore having a small passageway opening behind the insert directing a jet of high pressure coolant on the insert adjacent the rake face.

The invention also contemplates a method comprising the steps of diverting the normal coolant output of a CNC turret at a tool station to a coupling apparatus, removably attaching the coupling apparatus to a conventional coolant bored tool bar, and sealing the coupling apparatus with the distal end of the tool bar to define a high pressure chamber from which the coolant bore is the sole outlet.

An object of the invention is to facilitate chip breaking by a high pressure coolant jet impinging at the boundary of the rake face of the tool tip. The focus of the jet is optimal both for increasing the temperature gradient away from the tip and for consistent chip breaking in uniform "6" or "9" shapes and which are not discolored blue or black from excessive heat and stress buildup.

Another object is to utilize the coolant bore of any coolant bored tool bar as a high pressure coolant delivery extension of an existing coolant delivery manifold of a CNC machine on to the work at pressures of up 1500 psi.

Because of the limited clearance on the turret behind the tool holders and the tool stations and the setup needing to adjust a tool bar's length, or to accommodate different bar sizes, preferably not more than three times its diameter extending beyond the tool holder, the invention provides a coupling apparatus for adapting existing bored tool bars to any turret setup configuration.

Another object of the invention is to provide a cooling apparatus which removably fits over a coolant bore tool bar at the distal end where the bore opens defining a chamber with the distal end.

Another object of the invention is to connect a CNC machine turret coolant manifold delivery system to a tool holder having an internal conduit and diverting the output of the conduit to a coolant bored tool bar such that the distal end of the tool bar may be adjusted relative to the tool holder within the tool holder bore and a limited axial space within the projected circumference of the bore in the tool holder to the rear thereof.

Still another object of the invention is to provide a method of promoting chip breaking and tool life in CNC machining operations, especially for difficult cutting tasks which can only be successfully machined under rigorous conditions.

Another object is to improve chip breaking and tool wear. The cooling rate is enhanced to reduce any tendency for curls of a blue or black color to be formed. The rake face of the tool gouging out the chips will be cooled prolonging tool life. By increasing the temperature gradient from the tip by as much as fifty percent, in both the chip and the tool tip, heat otherwise retained is removed by the high pressure coolant flow.

Another object is providing a method of diverting the entire coolant supply from a pump to the distal end of a coolant bored tool bar which has a small passageway at the opposite end, and directing a jet of coolant at substantially increased pressure on the tool insert held by the bar.

These and other objects of the invention will be more apparent by reference to the following detailed description of the invention which proceeds with a detailed description of the drawings.

DETAILED DESCRIPTION OF THE DRAWINGS

Figure 2:
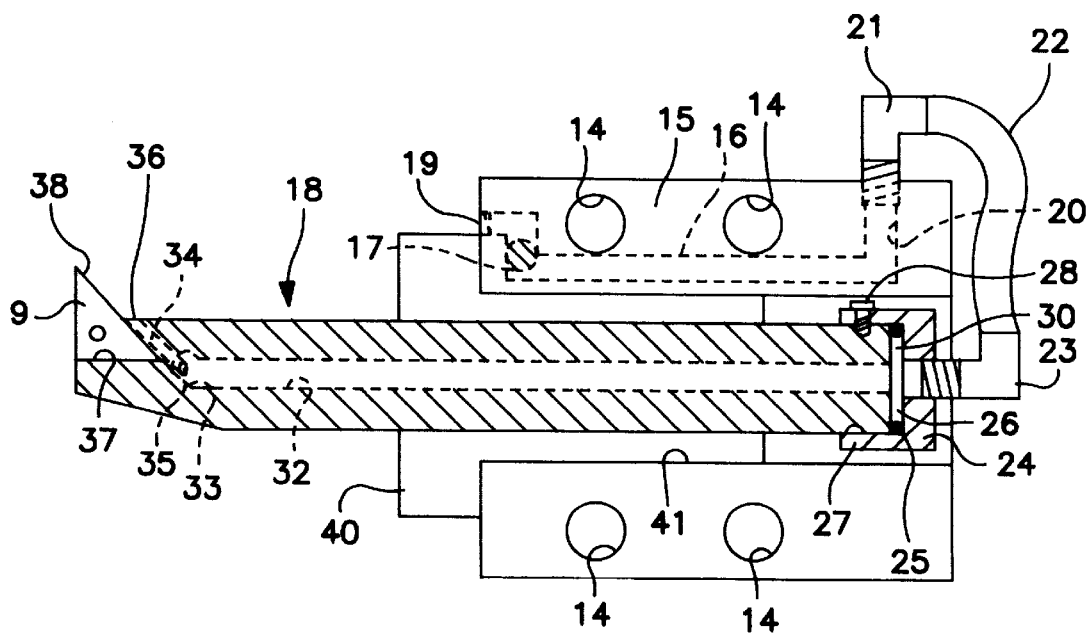

FIG. 1 is a partial orthogonal view of a CNC machining turret adapted to use the invention where a coolant bored bar is mounted at one of the turret's tool stations from which a coolant is available at manifold pressure; and FIG. 2 is a cross sectional view through the tool holder in FIG. 1.

DETAILED DESCRIPTION OF THE INVENTION

CNC machines deliver coolant by a pump/manifold system supplying coolant from a reservoir under pressure to each of up to twelve tool stations (8) on a turret (10). It indexes or rotates tools (12) into machining position. An insert (9) of tungsten carbide or other hard material is held by the tool to perform a cutting operation either by advancing the turret toward a workpiece (not shown) which is rotating on a spindle opposite the tool, or by advancing the spindle into the tool, as in so called Swiss lathes, while the workpiece is spinning. In FIG. 1, a tool holder (13) is mounted on the turret (10) at one of the tool stations (8) by set screws (14) in side flanges securing upper and lower halves (15) to the turret. As seen in FIG. 2, the lower half (15) has an internal conduit (16). It is fluid coupled to the manifold (not shown) of the turret by a port (17) receiving coolant at prevailing pump pressure of about 30 psi.

In accordance with the present invention, a coolant bored tool bar (18) receives substantially all of the coolant from the conduit (16), which is pugged at (19), through an outlet port (20) in which an elbow fitting (21) is threaded and connected by piping (22) to a second elbow fitting (23) threaded into a coupling sleeve (24). An O-ring (25) provides a seal with the distal end (26) of the bar (18) and an annular groove (27) receives a set screw (28) that firmly, but removable, holds the coupling sleeve on the distal end of the bar.

A high pressure chamber (30) is created by the joining of the coupling sleeve, or connector member (24) with the distal end (26) of the tool bar. A chamber or cavity (30) is formed by the annular side and end walls of the member (24) in combination with the cross sectional end wall of the tool bar. A seat with the distal end (26) of the bar and the walls of the cup-shaped connector member is made by the elastomeric O-ring (25) being resiliently pressed between the end wall of the cup-shaped body and distal end of the tool bar from which the only opening is the bore (32) through the center of the bar (18) terminating in the blind end (33). A small passage (34) opens at (35) and angles toward the surface of the bar exiting at (36). The insert (9) is mounted in a pocket (37) beyond the blind end of the bore. It has a cutting edge at which the passage (34) is aimed. The focus of the passage is such that a jet of coolant at very high pressure, up to 1500 psi, or higher is directed at an oblique angle toward the rake face (38) of the cutting edge. The edge boundary temperature gradient decreases from about 800 degrees C. to about 200 degree C. a few millimeters from the rake face depending on the rake angle and face geometry but it is an important feature of this invention that the temperature gradient is increased about fifty percent or more within 0.5 mm away from the edge boundary where the heat layer is at about 800 degrees C., or at the edge (38), the temperature is about 400 degrees C. when the pressure is as high as 1000 psi or higher, and increases away from the face more rapidly because of the very rapid removal of heat. Likewise, chips gouged out by the edge (38) will have a boundary temperature at the curl connections where the breaking occurs reduced by about fifty percent, or from about 450 degrees C. to about 200–225 degrees C., well within the acceptable range, and clearly not exhibiting a black or blue color except at the very edge of the curl.

The tool bar (18) should not extend unsupported beyond the clamping collar (40) that rigidly holds it in the bore (41) of the holder (18) more then three times the diameter of the tool bar itself, otherwise there is a tendency for vibrations to be set up due to a loss in rigidity of the tool bar, causing poor performance. Depending on the size of the tool bar, the distal end (26) may extend out the rear of the tool block or holder (15) creating a potential for interference behind the tool holder in the limited space on the turret making it difficult to connect any piping directly to the rear of the tool bar. Hence, the sleeve (24) is designed to fit within the tool holder bore (41) as depicted in FIG. 2.

Or where the bar is too long and has to be cut off because of the limited axial space behind the tool holder, thus eliminating the tapped end of a standard coolant bored bar provided for connection of piping from the coolant manifold, the coupling sleeve (24) fits over the distal end (26) of the cut off tool bar with the annular side walls telescoped onto the distal and complementary to the cross section at the location of the cut off of the bar. It will be understood that various coolant solutions are commercially available, typically, water emulsions of an alkali salt (Borax), trisilia phosphate, calcium sulfonate or barium sulfonate. The coolant solution may be a one or two per cent by volume constituent part of a water soluble chemical as described to comprise a coolant fluid which is pumped to the turret manifold under pressure by a coolant pump (not shown) either of the machine, too, of an auxiliary cooling system. Coolants are available commercially from companies such as EZ-KUT, of Springlake, Mich., 49456, for example, supplying a coolant known as EDU-700 having a flash point below 265° F.

In accordance with the method practiced by this invention, chip breaking and cooling of the cutting tool insert (9) are both optimized owing to the high pressure, up to 1500 psi, of coolant that is directed by the passage (34) onto the cutting edge (38) of the insert (9). The coupling apparatus provides a removable sleeve (24) fluid coupling with the distal end of the coolant bored tool bar.

In instances where a coolant bored tool bar is too long to attach piping directly to the tapped end of the bore at the distal end, it is cut off to the proper length to accommodate the tight conditions axially behind to tool holder. A coupling sleeve (24) is telescoped over the cut off end allowing the entire coolant volume to be delivered to the bore. Coolant is delivered from the turret manifold to the bore (32). Substantially all of the available coolant pressure is jetted out of the end of the bar directly onto the cutting edge (38) at an oblique angle. Owing to the high rate of cooling a uniform series of chips of a "6" or "9" shape will be created while at the same time keeping the insert cool to reduce premature wear of the cutting edge (38), otherwise required to be turned to expose a new cutting edge in normal operations after about 20 minutes of tool usage. With the invention, the tool life is extended for any given cutting operation by as much as one hundred (100) percent. Tool life is a function of various factors. An AISI steel grade of D-1112 in a cold drawn condition may have a machinability of 100 percent, a hardness in the order of 300–400 Brinell and a carbon carbon content of 0.3%, while a malleable iron with a Brinell of 110–145 would have a machinability of 120 percent as compared to the cold drawn D-1112 steel of 100%. On the non ferrous side, a wrought magnesium alloy (92.3 mg, 6.5 al, 0.2 mn, 1 zn) would have a Brinell of 58 and a machinability of 500–2000 percent, while at the other end of the scale, Inconel (78 ni, 14 cr, 6 fe) would be 35 percent, and difficult to machine. Similarly, stainless steel 18–8 austenitic in an as mill, annealed condition having a Brinell between 150–160 has a machinability rating of only 25 per cent.

With the invention, a machinability rating of 25 percent could be raised ten (10) percent. In the case of an 18–8 stainless steel, the workpiece would machine as if it were a plain carbon D-1112 steel.

The type of coolant selected varies according to the machinability of the workpiece. For example, if a ferrous metal of less than 40 percent machinability is being machined in a difficult machining operation, such as boring, a high temperature special sulfonate emulsion would be required having a high boiling point, such as described above, however with the invention, cheaper coolants or lubricants, and with relatively low boiling points may be used.

Finite element analysis of chip formation shows calculated chip temperatures reaching 600 degrees C., well above the boiling point of available coolants, and ranging 600–400 degrees C. in the boundary layers of plastic deformation from the frictional contact with the tool face toward the exterior surface away from the friction face. The influence of rake angle, or angle that the cutting edge makes with the vertical face of the tool entering the workpiece, the depth of cut, speed, shape of the tool face, and rate of advance of the tool, are all factors in determining heat and stress in plastic deformation. of chip formation. The temperature gradient with the invention is a relatively low (400–100 degrees C.) with a chip of 0.5 mm thick and blackened chips are not seen, as an indication of excessive heat build up and resultant tool wear.[1]

[1] Jun Shinozuka, Ph.D., Tokyo Institute of Technology, Department of Mechano-Aerospace Engineering, January 1999. Finite element analysis, orthogonal metal chip cutting simulations: see web site at www.jsshinozuka@mes.titech.ac.jp and *Journal of Materials Processing Technology,* 62(1996)345–351.

The present invention provides a cooling system, method and apparatus primarily for CNC machining centers utilizing the existing, or auxiliary coolant pumps, to deliver substantially one hundred percent of the coolant pressure to the cutting edge increasing the productivity under difficult machining conditions that would otherwise shorten tool life.

Thus, according to the invention, tool life is prolonged by as much as 10–60% and chip breaking occurs in a uniformly discontinuous curling fashion owing to the jetting action of the coolant directed onto the cutting edge from the passageway opening (36) at which is angled to impinge at the boundary layer immediately behind the plastic deformation occurring in chip formation. Of course, the invention is described in chip breaking terms, but it will equally apply to drill bits, or other tools.

Accordingly, the invention may be seen as being a machining method, apparatus or accessory for existing CNC machine tools to increase their productivity. However, the invention as defined by the appended claims, is deemed to cover various modifications of the preferred embodiment as disclosed herein, according to the scope of the claims, which modifications are deemed covered as equivalent structures as will be apparent to those of ordinary skill in the machine tool art. For example, standard tool coolant bored tool bars have several diameters and lengths depending on the insert and cutting job, but all are designed to fit within the standard tool holder bore of about one and a half inches. The bars have longitudinal flat surfaces to allow them to be clamped at the correct angle for a given tool face relative to the work piece, but it is within the scope of the invention to provide a cylindrical tool bar and thread the distal end and instead of the sleeve (24) being milled out with flats slightly larger than the flats on the standard bar, it could be cylindrical inside and threaded onto the end of the bar with sealably engaging threads eliminating the O-ring. Or the surfaces of the bar and inside of the sleeve could be precision machined and coupled without threads by friction fit, also eliminating the O-ring as a seal. Or the bar could be milled out and a quick disconnect coupling installed on the piping (22) instead of the elbow fitting (23). Or the tool holder bore (41) could be closed off, and the longitudinal gaps plugged around the tool bar, and the elbow (23) replaced with a female connector threaded on to a male one extending from the back of the bore of the holder. These and other modifications will be apparent from the following claims, accordingly,

I claim:

1. In a machine tool, a frame, an indexable turret rotatably supported on the frame, a tool station having limited free space for mounting a cutting tool in at least one of the indexed positions of the turret, a coolant reservoir remote from the turret, an outlet for coolant accessible at said one tool station, a pump for delivering coolant from the reservoir to said outlet, a tool holder mounted at said one tool station having an open through hole with one end opening toward said limited free space, the other end opening adjacent to where a cutting operation is to be performed at said tool station, the cross sectional area of the hole, when projected beyond said one end, extending into a limited interference free zone for permitting access to the one end without running into an interference tolerance condition inherent with the structure of the turret at said one tool station, an improvement comprising:

a coolant bored tool bar having an elongated body with a transverse cross sectional area smaller than the transverse cross sectional area of said hole, and having a distal end from which the tool bar's coolant bore is accessable from within said interference free zone, and a connector body having wall portions defining a cavity in fluid communication with said outlet connectable to the distal end of the tool bar such that the combined length of the tool bar and connector body when mounted in the tool holder for a cutting operation does not exceed the tolerances allowed by the interference free zone at said tool station, and means for sealing the cavity so that the coolant bore is the sole means of escape for coolant pumped into the cavity from said outlet whereby standard coolant bored tool bars may be secured during set up for a cutting operation without interference with the turret structure.

2. The improvement according to claim 1 wherein the tool bar has a length causing the distal end to be too long to avoid interference within said interference free zone when secured in the tool holder in a cutting position and a longitudinal end section of a predetermined length is removed exposing a fresh cross sectional area which becomes said distal end for assembling with said connector body.

3. The improvement according to claim 1 wherein said connector body comprises substantially annular side walls, joined by an end wall, and having an open side opposite said end wall giving said body a generally cup-shape capable of receiving in said open side, in complementary fashion with said side walls, said distal end of the tool bar having a substantially circular cross section capable of serving as a closure for said open side to form said cavity from which the tool bar coolant bore is the sole outlet.

4. The improvement according to claim 3 wherein the means for sealing the cavity includes an elastomeric O-ring resiliently engaging with the distal end of the tool bar, and said end and side walls of the cup-shaped connector body when assembled on the distal end of the tool bar.

5. In a machine tool having a tool station, a tool holder having an open through bore mounted at the tool station, a limited amount of space aligned with said bore at the tool station rearwardly of the tool holder, a tool bar received within the bore of the tool holder having a front end projecting longitudinally beyond the bore in the direction of a work piece on which a machining operation is to be performed, a pocket formed adjacent the front end for mounting an insert to engage a work piece during a cutting operation, a rear distal end opposite the front end of the tool bar accessible from said space, mounting means for securing the tool bar in said bore such that the front end is secured relative to the mounting means about three times the transverse width of the bar so as to firmly hold an insert during a machining operation in a relatively stable, vibration free condition, while the position of the rear distal end remains accessible from said limited free space rearwardly of the tool holder, a coolant bore within the tool bar having an inlet opening and an outlet opening, the latter exiting adjacent the front end for directing a narrowly confined stream of coolant onto an insert during a machining operation, while the inlet opens adjacent the rear distal end of the tool bar, a coolant reservoir, a pump capable of delivering coolant from the reservoir, an improvement comprising:

a coolant apparatus adapted to receive substantially all of the coolant delivered by the pump comprising, a coupling member having a annular cup-shaped body capable of being removably assembled on said tool bar in complementary fashion defining a cavity with the distal end such that the inlet opening of the coolant bore in the tool bar is the only outlet from said cavity, said coupling member having an axial width when assembled on the tool bar capable of being accessed from said limited free space on tool bars of different lengths without projecting beyond said limited free space, and means for releasably securing said coupling member onto the distal end of the tool bar whereby tool bars of various standard lengths are accommodated.

6. The improvement according to claim 5 wherein said mean for releasably securing said coupling member includes a groove in the tool bar and a set screw in said cup-shaped body cooperating with said groove near the distal end of the tool bar.

7. The improvement according to claim 5 wherein the cup-shaped body has inner walls machined to provide a close tolerance fit with the outer surface near the distal end of the tool bar.

8. The improvement according to claim 5 wherein the cup-shaped body has annular wall portions joined by a flat end wall having a central threaded opening adapted to be connected to the coolant apparatus.

9. The improvement according to claim 8 wherein the, cup-shaped body annular wall portions extend circumferentially within the projected circumference of the bore of the tool holder and is receivable within said bore when assembled on to the distal end of a tool bar, said cavity being formed between the flat wall, the annular wall portions and the distal end of the tool bar defining a fluid chamber from which the sole outlet is the inlet of the tool bar coolant bore.

10. The improvement according to claim 9 wherein an elastomeric O-ring is resiliently pressed against the flat wall of the cup-shaped body by the distal end of the tool bar when assembled therewith.

11. A machine tool comprising:

a source of coolant under pressure, a workpiece upon which a machining operation is to be performed, a tool for performing the machining operation, fluid coupling means adapted to connect the source of coolant to a location adjacent the tool comprising, a coupling sleeve having an annular wall, a rear wall joining the annular wall having an opening, a pipe fitting in said opening, piping means connectable from the pipe fitting to the source of coolant under pressure, a coolant bored tool bar for holding the tool adjacent the workpiece in a rigid fashion to perform the machining operation, said bar being elongated and having a rear distal end and a forward end for holding the tool, said bore having a blind end adjacent the forward end and inlet end adjacent the coupling sleeve, said blind end having a small passageway angled toward the surface of the bar behind the tool directing coolant on the tool adjacent a machining operation when the coupling sleeve is affixed to the distal end of the bar, and fastening means for removably securing the coupling sleeve on to the bar.

12. A machine tool according to claim 11 comprising, an O-ring between the rear wall of the coupling sleeve and the distal end of the bar defining a chamber the only outlet from which is the bore of the tool bar.

13. A machine tool according to claim 12 comprising, a set screw and groove arrangement between the distal end of the bar and annular wall of the coupling sleeve for removably attaching the two together.

14. A machine tool according to claim 11 comprising, a tool bar holder having a through bore the diameter of which is substantially greater than the widest cross sectional dimension of the tool bar, the latter being telescoped in said bore such that there is limited axial space to the rear of said bore, and said coupling sleeve having an axial length adapted to be received within said limited axial space.

15. A method of connecting a source of coolant under pressure to one of several standard coolant bored tool bars of varying lengths adapted to be fixed within a center bored tool holder open on opposite ends and having limited axial space behind its rear end opposite the end adjacent a cutting operation comprising the steps of:

providing a coupling member having an annular wall joined by an end wall, the annular wall having an axial width capable of fitting within said axial space when assembled on the tool bar, inserting a tool bar having a given standard length into the tool holder exposing its distal end at the rear end of the tool holder, assembling said coupling member onto the distal end, and fastening the coupling member with a releasable connection.

16. The method according to claim 15 comprising in addition the steps of cutting off a predetermined end section of the tool bar exposing a transverse cross sectional end intermediate its length, assembling the coupling member onto said cross sectional end, and securing the tool bar longitudinally within the bore of the tool holder such that it does not extend substantially more than three times the cross sectional width of the tool bar from the securing location within the bore whereby standard bars of excessive length are accommodated after being cut off.

17. The method according to claim 16 comprising in addition the step of sealing the coupling member and distal end of the tool bar to define said fluid chamber.

\* \* \* \* \*